UNITED STATES PATENT OFFICE.

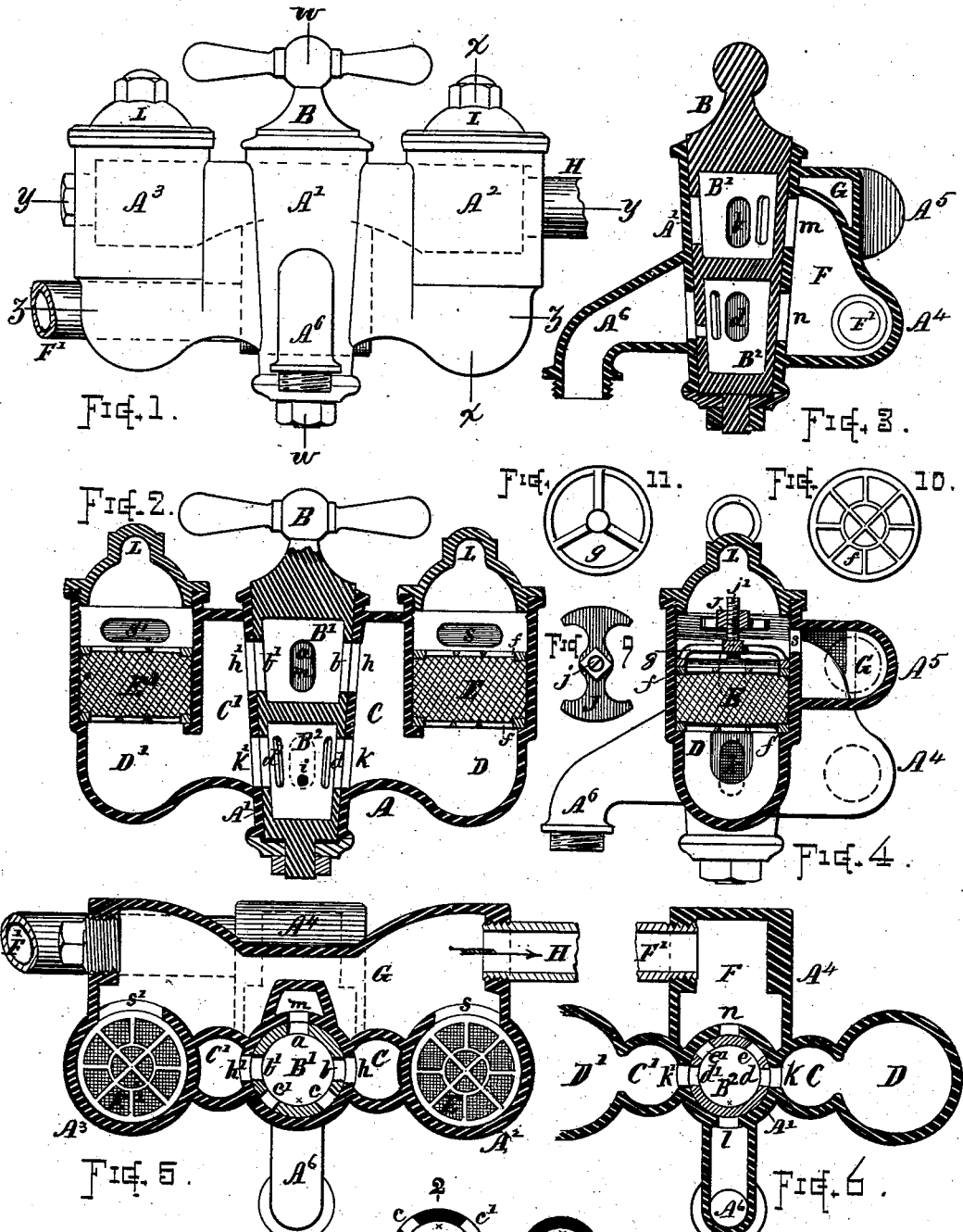

JOHN HOWES, OF WORCESTER, MASSACHUSETTS.

FILTER.

SPECIFICATION forming part of Letters Patent No. 236,496, dated January 11, 1881.

Application filed March 29, 1880. (No model.)

*To all whom it may concern:*

Be it known that I, JOHN HOWES, of Worcester, in the county of Worcester and State of Massachusetts, have invented certain new and useful Improvements in Filters; and I declare the following to be a description of my said invention sufficiently full, clear, and exact to enable others skilled in the art to which it appertains to make and use the same, reference being had to the accompanying drawings, which form a part of this specification.

The object of my invention is to provide an apparatus for filtering water or other liquids, which can be readily applied to ordinary service-pipes for household or other uses, one that shall be durable and convenient of operation, and in which the filtering-plates or strainers can be cleaned by means of the filtered water or liquid passed in reverse flow through said plates and without change or removal of the filtering material. I attain these objects by mechanism substantially such as shown in the accompanying drawings, and embracing the features hereinafter described, the particular subject-matter claimed being hereinafter definitely specified.

In the drawings, Figure 1 represents a front view of a filter apparatus embracing the features of my invention. Fig. 2 is a longitudinal vertical section of the same, showing the valve-plug in position as adjusted for filtering the water. Fig. 3 is a transverse vertical section at line $w\ w$, Fig. 1, showing the valve-plug in position as adjusted for shutting off the water. Fig. 4 is a transverse section through one of the filter-chambers at line $x\ x$, Fig. 1, showing a device for securing the filter-plates in position. Fig. 5 is a horizontal section through the upper part of the apparatus at line $y\ y$, Fig. 1. Fig. 6 is a horizontal section through the lower part of the apparatus at line $z\ z$. Fig. 7 is a horizontal section through the upper chamber and ports of the valve-plug, with figure diagram illustrating different positions of adjustment for said valve. Fig. 8 is a similar section through the lower chamber and ports of the valve-plug. Fig. 9 is a plan view of a bar and screw for pressing down the filter-plates. Fig. 10 is a plan view of one of the grates between which the filter plates or material are retained, and Fig. 11 is a plan view of the follower used between the grate and cross-bar screw.

The letter A denotes the body or shell, which is, in the present instance, made or cast in a single piece, preferably from brass or composition metal, and comprises a central cock or valve-seat, $A'$, flanked at right and left by filter-cylinders $A^2\ A^3$, and having at the rear projecting portions $A^4$ and $A^5$, arranged to be tapped at either side for the reception of the service-pipes, and at the front a spout or nozzle, $A^6$, similar to an ordinary bib.

B denotes the turn-cock or valve-plug, of conical form, arranged to fit the seat $A'$, and provided with a cross-head, handle, or nut at its upper end, whereby said plug can be conveniently turned and adjusted for directing the flow of water in the desired course. The valve-plug is made with an upper internal chamber, $B'$, having ports or openings $a\ b\ b'\ c\ c'$, arranged as shown in Figs. 5 and 7, and with a lower internal chamber, $B^2$, having ports $d\ d'\ e\ e'$, arranged as indicated in Figs. 6 and 8. A small hole, $i$, may also be formed into the chamber $B^2$, if desired, for draining the filter-chambers when the water is shut off.

C $C'$ indicate passages leading to the lower part of the filter-chambers D $D'$, and opening into said chambers below the filter-plates. Said passages C $C'$ communicate with the valve-chambers through ports $h\ h'\ k\ k'$ in the valve-seat.

E $E'$ indicate the filtering-plates or strainers, located in the chambers D $D'$, and confined between supporting-grates $f\ f$, which may be secured in position in any suitable manner. The filter-plates E $E'$ may be of felt or any other suitable material, or composed of two or more different substances combined, as desired.

A device is shown in Fig. 4 for securing the filter-plates, which consists of a grate, $f$, Fig. 10, that rests upon an annular shoulder on the inner surface of the cylinder, and on which the filtering material is supported. Another similar grate is placed on top of the material E. Then a follower, $g$, Fig. 11, having an annular rim and central elevated hub, is placed on said grate, and above this a cross-bar, J, Fig. 9, fitting the screw-thread of the cap opening on its ends, and provided with a central set-screw, $j'$, that turns down onto the hub of the follower $g$ and clamps its rim firmly down upon the grate $f$ and filter-plate around the outer edge, leaving the central part of said filter-plate free from pressure.

F indicates the supply chamber or passage within the lower rear projection, $A^4$, into which the service-pipe $F'$ is connected. Ports $m$ and $n$, through the back of the valve-seat $A'$, connect the chamber F with the valve-ports in the upper and lower chambers, respectively.

G indicates the delivery-passage, extending across the back of the apparatus within the upper rear projecting part, $A^5$, and connecting the chambers D D', through ports $s\ s'$, located above the filtering-plates E E'.

H denotes the delivery-pipe, from which filtered water is drawn or conducted to any desired locality.

The projections $A^4\ A^5$ are tapped, so that they can be connected with the pipes $F'$ and H either at the right or left, the opening at their opposite end being closed with a screw-stopper. The rear side of the parts $A^4\ A^5$ are arranged in the same plane, so as to rest squarely against a wall or backboard. The filter can be attached to the service-pipes at any convenient location either in the house-cellar, at the kitchen-sink, or elsewhere, as desired.

The operation is as follows: The valve-plug B being in position as indicated in Figs. 3, 7, and 8, with the port $a$, or part marked by the index ↓, at the front, the ports $m$ and $n$ will be closed and the water entirely shut off. By reversing the position of the plug B, (carrying the index-mark to the position 2, Fig. 7,) or adjusting it to the position shown in Figs. 2, 5, and 6, the port $a$ is brought in line with the inlet-port $m$, and the ports $b\ b'\ d\ d'$ in line with the ports $h\ h'\ k\ k'$, respectively, and the water then flows through the valve into the passages C C', and thence into both filter-chambers D D', upward through the filtering-plates or strainers E E', and by way of the ports $s\ s'$ and passage G to the delivery H. By turning the valve-plug B one-quarter revolution in either direction to the position indicated at 3, Fig. 7, the ports $b\ d$ or $b'\ d'$ are brought in line with ports $m$, $n$, and $l$, then the unfiltered water can flow directly through the apparatus and out at the spout $A^6$, giving a rapid delivery of the water in its ordinary condition as may be desired when using a hose connected to the spout $A^6$, and for many other purposes wherein clear water is not required. By turning the valve-plug B one-eighth revolution, or adjusting it to correspond with position 4, Fig. 7, the port $c'$ is brought in line with port $m$, $c$ with $h'$, $e'$ with $k$, and $e$ with $l$. The course of the water is then through the upper chamber, B', of the valve-plug to the left filter-chamber D', up through the filter-plate E', across to the upper part of the right-hand filter-chamber D, by way of the passage G and and ports $s'\ s$, downward through the filter-plate E, for cleansing said plate of the sediment deposited on its under surface, and thence out through the lower chamber, $B^2$, and bib $A^6$, by way of the ports $k$, $e'$, $e$, and $l$, thus washing off the mud or collected matter from the plate or strainer E, and clearing the sediment from the lower part of the right-hand filter by means of filtered water or liquid passed through and purified by the left-hand filter. The flow of water can be continued as long as necessary for cleansing the filter-plates. By adjusting the valve-plug to the position 5, Fig. 7, the port $c$ is brought in line with port $m$, $c'$ with $h$, $e$ with $k'$, and $e'$ with $l$. The course of the water is then similar to that last above described, but in opposite direction, passing upward through the right-hand filter and downward through the left for washing off the filter-plate E', and forcing the sediment from the left-hand chamber, D'.

The construction of the filter-cylinders and location of the filtering-plates is such that the water or liquid passes upward through said plates, depositing its sediment on their under surfaces, so that when the flow ceases the heavier particles of deposited matter tend, by gravity, to fall into the hollows at the bottom of the chambers D D', and where they lie until dislodged by the reverse flow of the water. By cleaning the filters in the manner described, by the reverse action and by filtered water from the opposite filter, sediment does not become deposited on the upper surfaces of the filter-plates, since only purified water can enter the passage G. This method of cleansing the filter-plates alternately is an important feature of my invention. The filter-plates being surrounded by water at equal pressure top and bottom, except when flowing through, are not subjected to drying, draining, or atmospheric action, tending to solidify or incrust the deposited matter upon the material of the filters. By arranging the filters and valve-plug in the manner shown, and providing said plug with the opening $i$, the water can be shut off from the filters and the filters drained to prevent freezing, or to allow access to the interior of the filter-chambers by removal of the screw-caps L.

What I claim as of my invention, and desire to secure by Letters Patent, is—

1. The valve-plug B, provided with chamber B', having the series of ports $a\ b\ b'\ c\ c'$, and the chamber $B^2$, having the series of ports $d\ d'\ e\ e'$, substantially as shown, in combination with the valve-seat A', having the upper and lower series of ports $h\ h'\ m$ and $k\ k'\ n\ l$, as and for the purposes set forth.

2. The shell or casting constructed substantially as described, with central valve-seat, right and left cylinders, connecting-passages, and outlet and inlet apertures, for the purposes set forth.

3. In a filtering apparatus, the combination of two separate filters, either one of which can be automatically cleansed by water filtered through the other in continuous flow, as described, and an adjustable valve-cock, adapted to direct the flow of water or liquid through said filtering devices, substantially as hereinbefore set forth.

4. In a filtering apparatus, the combination of the duplex or independently-operative filters, each communicating, for the flow of filtered water or liquid, with a common chamber or passage, from which unfiltered water is excluded, and the cock or regulating-valve, with connecting-passages for directing the flow of liquid into or from either or each of said filters, operating substantially as hereinbefore set forth, whereby water or liquid passed directly through one of said filters can be passed reversely through the other, or vice versa, and either filter cleansed, by water or liquid, from the other, as described.

5. In a filtering apparatus, the combination, substantially as described, of the two filtering devices D E and D' E', the supply chamber or pipe F, the delivery pipe or outlet G H, for filtered water only, the delivery pipe or spout $A^6$, for unfiltered water, and the central turn-cock or valve, B, having upper and lower series of ports, as shown, said apparatus being adapted for the delivery of filtered water and unfiltered water, and for cleansing of the filter-plates with filtered water, as set forth.

6. In a filtering apparatus, the right and left cylinders, $A^2 A^3$, provided with rounded bottoms, removable tops L, and annular offsets for supporting the plates of filtering material E E' at a central location, the filtered-water chamber or passage G, communicating with the filter-chambers through ports $s\ s'$, located above said filter-plates, and the water-passages C C', leading from the directing cock or valve into the lower parts of said cylinders, beneath said plates, all arranged substantially as set forth and for the purposes stated.

7. The combination, with the filter and valve cylinders, of the rearward extensions, adapted to receive the supply and delivery pipes at either the right or left hand, substantially as set forth.

8. In a filtering apparatus, the combination, with two filtering devices, of a single cock or valve-plug, arranged substantially as described, and adapted for directing the flow to either or both of said filters, or for completely shutting the water therefrom and draining the filters, when desired, by a simple adjustment or turn of said plug, as hereinbefore set forth.

Witness my hand this 25th day of March, A. D. 1880.

JOHN HOWES.

Witnesses:
CHAS. H. BURLEIGH,
S. R. BARTON.